(12) United States Patent
Gong et al.

(10) Patent No.: US 12,200,768 B2
(45) Date of Patent: Jan. 14, 2025

(54) METHODS AND APPARATUS FOR DETERMINING NETWORK IDENTIFIER FOR USE BY USER EQUIPMENT

(71) Applicant: Huawei Technologies Co., Ltd., Shenzhen (CN)

(72) Inventors: Zhengwei Gong, Ottawa (CA); Mohammadhadi Baligh, Ottawa (CA); Yu Cao, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 67 days.

(21) Appl. No.: 16/557,219

(22) Filed: Aug. 30, 2019

(65) Prior Publication Data

US 2019/0387553 A1 Dec. 19, 2019

Related U.S. Application Data

(63) Continuation of application No. PCT/CN2018/082792, filed on Apr. 12, 2018.
(Continued)

(51) Int. Cl.
*H04W 74/0833* (2024.01)
*H04W 72/23* (2023.01)
*H04W 74/00* (2009.01)

(52) U.S. Cl.
CPC ....... *H04W 74/0833* (2013.01); *H04W 72/23* (2023.01); *H04W 74/006* (2013.01)

(58) Field of Classification Search
CPC ............. H04W 72/042; H04W 74/006; H04W 74/0833
See application file for complete search history.

(56) References Cited

U.S. PATENT DOCUMENTS 8,280,391 B2 * 10/2012 Kim ................. H04W 74/0833
370/329
10,264,581 B1 * 4/2019 Zhou ..................... H04L 5/0053
(Continued)

FOREIGN PATENT DOCUMENTS

| CN | 101405986 A | 4/2009 |
| CN | 101601194 A | 12/2009 |

(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.5.0, Mar. 2017, 93 Pages.
(Continued)

*Primary Examiner* — Khaled M Kassim
(74) *Attorney, Agent, or Firm* — Slater Matsil, LLP

(57) ABSTRACT

A method of data communication, comprising: obtaining resource unit information associated with a physical uplink channel; determining an identifier at least in part based on the resource unit information; and using the identifier for transmission of a physical uplink shared channel (PUSCH). Also, a method of data communication, comprising: obtaining resource unit information associated with a physical uplink channel; determining an identifier at least in part based on the resource unit information; and using the identifier for transmission of a physical downlink channel. Also, an apparatus comprising a processor and an RF communication unit, the processor configured to obtain resource unit information associated with a physical uplink channel; determine an identifier at least in part based on the resource unit information; and use the identifier for transmission of a physical uplink shared channel (PUSCH) or a physical downlink channel.

26 Claims, 11 Drawing Sheets

Related U.S. Application Data

(60) Provisional application No. 62/485,305, filed on Apr. 13, 2017.

(56) References Cited

U.S. PATENT DOCUMENTS

| | | | |
|---|---|---|---|
| 2011/0268045 A1 | 11/2011 | Heo et al. | |
| 2013/0010720 A1* | 1/2013 | Lohr | H04W 72/0453 370/329 |
| 2013/0021979 A1* | 1/2013 | Kwon | H04W 56/0045 370/328 |
| 2013/0044708 A1* | 2/2013 | Kim | H04W 76/40 370/329 |
| 2013/0163537 A1* | 6/2013 | Anderson | H04L 1/1671 370/329 |
| 2013/0195041 A1* | 8/2013 | Papasakellariou | H04L 1/0038 370/329 |
| 2013/0250888 A1 | 9/2013 | Lu | |
| 2013/0301541 A1* | 11/2013 | Mukherjee | H04W 74/0833 370/329 |
| 2014/0204835 A1* | 7/2014 | Speight | H04W 72/0446 370/315 |
| 2015/0124746 A1 | 5/2015 | Wu et al. | |
| 2015/0230246 A1 | 8/2015 | Choi et al. | |
| 2017/0094688 A1 | 3/2017 | Lee et al. | |
| 2017/0180098 A1* | 6/2017 | You | H04L 5/0058 |
| 2017/0295005 A1* | 10/2017 | Lee | H04W 36/0055 |
| 2017/0367058 A1* | 12/2017 | Pelletier | H04W 52/246 |
| 2018/0123765 A1* | 5/2018 | Cao | H04L 1/1822 |
| 2018/0131493 A1* | 5/2018 | Luo | H04L 27/26025 |
| 2018/0227958 A1* | 8/2018 | Xiong | H04W 88/023 |
| 2018/0270854 A1* | 9/2018 | Lee | H04W 72/042 |
| 2019/0014598 A1* | 1/2019 | Yoshimura | H04W 16/14 |
| 2019/0052329 A1* | 2/2019 | Aiba | H04L 5/006 |
| 2019/0174472 A1* | 6/2019 | Lee | H04W 72/042 |
| 2019/0393987 A1* | 12/2019 | Hong | H04L 1/0057 |
| 2020/0045722 A1* | 2/2020 | Bae | H04W 72/1242 |

FOREIGN PATENT DOCUMENTS

| | | |
|---|---|---|
| CN | 101689949 A | 3/2010 |
| CN | 102687546 A | 9/2012 |
| CN | 102870366 A | 1/2013 |
| CN | 103053125 A | 4/2013 |
| CN | 103797865 A | 5/2014 |
| CN | 105636223 A | 6/2016 |
| WO | 2016182533 A1 | 11/2016 |
| WO | 2017028051 A1 | 2/2017 |
| WO | 2017030601 A1 | 2/2017 |
| WO | 2017052452 A1 | 3/2017 |

OTHER PUBLICATIONS

CATT, "Discussion on UL grant-free transmission", 3GPP TSG RAN WG1 Meeting #87, R1-1611400, Nov. 14-18, 2016, 2 Pages, Reno, USA.

Samsung, "Discussion on non-orthogonal multiple access", 3GPP TSG RAN WG1 Meeting #88b, R1-1706119, Apr. 3-7, 2017, 5 Pages, Spokane, Washington, USA.

\* cited by examiner

| Preamble | GF-PUSCH | GF-RNTI (PUSCH) | RA-RNTI (RAR) | GF-RNTI (ACK/NACK) |
|---|---|---|---|---|
| (Legacy) | Random | Group common | Group common | Group common |
| (Legacy) | Random | UE-specific | Group common | Group common |
| (Legacy) | Random | UE-specific | Group common | UE-specific |
| Legacy | Mapping | Group common | Group common | Group common |
| Legacy | Mapping | UE-specific | Group common | Group common |
| Legacy | Mapping | UE-specific | Group common | UE-specific |
| Specific | Mapping | Group common | Group common | |
| Specific | Mapping | UE-specific | Group common | |

FIG. 6

| DCI format X | |
|---|---|
| TPC command for scheduled PUSCH | set to '00' |
| Cyclic shift DM RS | UE ID (high layer) |
| Modulation and coding scheme and redundancy version | |
| HARQ process number | |
| Modulation and coding scheme | |
| Redundancy version | |
| CRC mask | GF-RNTI |

FIG. 9A

| DL slot | |
|---|---|
| Precluded | UE ID (high layer) |
| | Scrambling with GF-RNTI |

FIG. 9B

METHODS AND APPARATUS FOR DETERMINING NETWORK IDENTIFIER FOR USE BY USER EQUIPMENT

CROSS-REFERENCE TO RELATED APPLICATIONS

The present application is a continuation of PCT Application No. PCT/CN2018/082792, filed on Apr. 12, 2018, entitled "METHODS AND APPARATUS FOR DETERMINING NETWORK IDENTIFIER FOR USE BY USER EQUIPMENT," which claims priority to U.S. Provisional Patent Application Ser. No. 62/485,305, filed Apr. 13, 2017, entitled "METHODS AND APPARATUS FOR DETERMINING NETWORK IDENTIFIER FOR USE BY USER EQUIPMENT", the contents of which are incorporated herein by reference in their entirety.

TECHNICAL FIELD

The present disclosure relates generally to wireless networks and, in particular, to determining a network identifier for use by user equipment (UE) within such networks.

BACKGROUND

In a typical wireless network such as a long-term evolution (LTE) network, various communication exchanges take place between user equipment (UE) and a base station before the UE is allowed to transmit uplink data. For example, a scheduling and grant mechanism may be used to identify and reserve certain radio frequency resources for use by the UE in uplink transmission. The scheduling and grant mechanisms are typically controlled by the base station.

However, a potential problem with this approach is that the signaling resource overhead for the scheduling and grant mechanisms can be quite large, especially in cases where the amount of data transmitted is small.

In light of the above, there is a need for improving the mechanisms by which UEs communicate with base stations.

SUMMARY

According to a first broad aspect there is provided a method of data communication that comprises obtaining resource unit information of a physical uplink channel between at least one user equipment (UE) and a base station; and using the identifier for grant-free communication between at least one UE and the base station.

Optionally, in any of the previous aspects, the physical uplink channel is the physical uplink shared channel (PUSCH).

Optionally, in any of the previous aspects, the physical uplink channel is a physical random access channel (PRACH).

Optionally, in any of the previous aspects, the resource unit information comprises at least one of time resource unit information, frequency resource unit information and sub resource unit information associated with the physical uplink channel.

Optionally, in any of the previous aspects, the method further comprises altering data for transmission by the PUSCH.

Optionally, in any of the previous aspects, altering the data for transmission by the PUSCH includes at least one of a scrambling operation and a masking operation.

Optionally, in any of the previous aspects, the method further comprises using the identifier for reception of at least one of a physical downlink control channel (PDCCH) and a physical downlink shared channel (PDSCH) which is altered by the first identifier.

Optionally, in any of the previous aspects, the identifier is a first identifier. The method further comprises:
  determining a second identifier based on second resource unit information different from the first resource unit information;
  using the second identifier for reception of at least one of a physical downlink control channel (PDCCH) and a physical downlink shared channel (PDSCH) which is altered by the first identifier.

Optionally, in any of the previous aspects, the time resource unit information pertaining to the at least one data resource unit comprises an index representing a system frame, subframe, time slot, mini-slot or OFDM symbol.

Optionally, in any of the previous aspects, the frequency resource unit information pertaining to the at least one data resource unit comprises an index representing a sub-band, PRB (physical resource block), PRB set, PRG (PRB group), SC (sub-carrier) or BWP (bandwidth part).

Optionally, in any of the previous aspects, the sub resource unit information pertaining to the at least one data resource unit is representative of a codebook/codeword, sequence, interleaver pattern, mapping pattern, demodulation reference signal, preamble or spatial, power, layer or port domain.

Optionally, in any of the previous aspects, the resource unit information associated with the physical uplink channel is explicitly configured or indicated by at least one of a broadcasting channel and a dedicated semi-static channel (RRC).

Optionally, in any of the previous aspects, the method is implemented by at least one UE.

Optionally, in any of the previous aspects, the identifier is a grant-free radio network temporary identifier (GF-RNTI).

According to a second broad aspect there is provided a method of data transmission between at least one user equipment (UE) and a base station, which comprises determining a grant-free radio network temporary identifier (GF-RNTI); and altering data or transmission on a physical channel with the GF-RNTI; transmitting the altered data on the physical channel.

According to a third broad aspect there is provided user equipment comprising a processor and an RF communication unit, the processor configured to obtain resource unit information of a physical uplink channel; determine a grant-free radio network temporary identifier (GF-RNTI) at least in part based on the resource unit information; and use the GF-RNTI for grant-free communication with a base station over the physical channel.

According to a fourth broad aspect there is provided user equipment comprising a method of processing a physical downlink channel, which comprises: using an identifier determined from PUSCH resource unit information and previously used for grant-free uplink communication to process the physical downlink channel.

According to a fifth broad aspect, there is provided a method of processing a physical downlink channel, which comprises: using an identifier determined from PRACH resource unit information and previously used for grant-free uplink communication to process the physical downlink channel.

According to a further broad aspect, there is provided a method of data communication, comprising: obtaining resource unit information associated with a physical uplink channel; determining an identifier at least in part based on the resource unit information; and using the identifier for transmission of a physical uplink shared channel (PUSCH).

Optionally, in any of the previous aspects, the physical uplink channel is a physical uplink shared channel (PUSCH) or a physical random access channel (PRACH).

Optionally, in any of the previous aspects, the physical downlink channel is a physical downlink control channel (PDCCH) or a physical downlink shared channel (PDSCH).

Optionally, in any of the previous aspects, the resource unit information comprises at least one of time resource unit information, frequency resource unit information and sub resource unit information associated with the physical uplink channel.

Optionally, in any of the previous aspects, using the identifier for transmission of a physical downlink channel comprises altering data for transmission by the physical downlink channel.

Optionally, in any of the previous aspects, altering data for transmission by the physical downlink channel includes at least one of a scrambling operation and a masking operation.

Optionally, in any of the previous aspects, wherein the resource unit information associated with the physical uplink channel is explicitly configured or indicated by at least one of a broadcasting channel and a dedicated semi-static channel (RRC).

Optionally, in any of the previous aspects, the method is implemented by a base station.

Optionally, in any of the previous aspects, the identifier is a grant-free radio network temporary identifier (GF-RNTI).

According to a further broad aspect, there is provided a method of data communication, comprising: obtaining resource unit information associated with a physical uplink channel; determining an identifier at least in part based on the resource unit information; and using the identifier for transmission of a physical downlink channel.

According to a further broad aspect, there is provided an apparatus comprising a processor and an RF communication unit, the processor configured to obtain resource unit information associated with a physical uplink channel; determine an identifier at least in part based on the resource unit information; and use the identifier for transmission of a physical uplink shared channel (PUSCH) or a physical downlink channel.

Optionally, in any of the previous aspects, the physical downlink channel is a physical downlink control channel (PDCCH) or a physical downlink shared channel (PDSCH).

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIG. 6 illustrates a table of possible cases for grant-free transmission and reception, in accordance with non-limiting embodiments;

FIG. 9A illustrates a table showing a downlink control indicator (DCI) format, in accordance with a non-limiting embodiment;

FIG. 9B illustrates a table showing downlink (DL) slot format, in accordance with a non-limiting embodiment;

It is to be expressly understood that the description and drawings are only for the purpose of illustrating certain embodiments of the invention and are an aid for understanding. They are not intended to be a definition of the limits of the invention.

DETAILED DESCRIPTION OF ILLUSTRATIVE EMBODIMENTS

Figure 1:
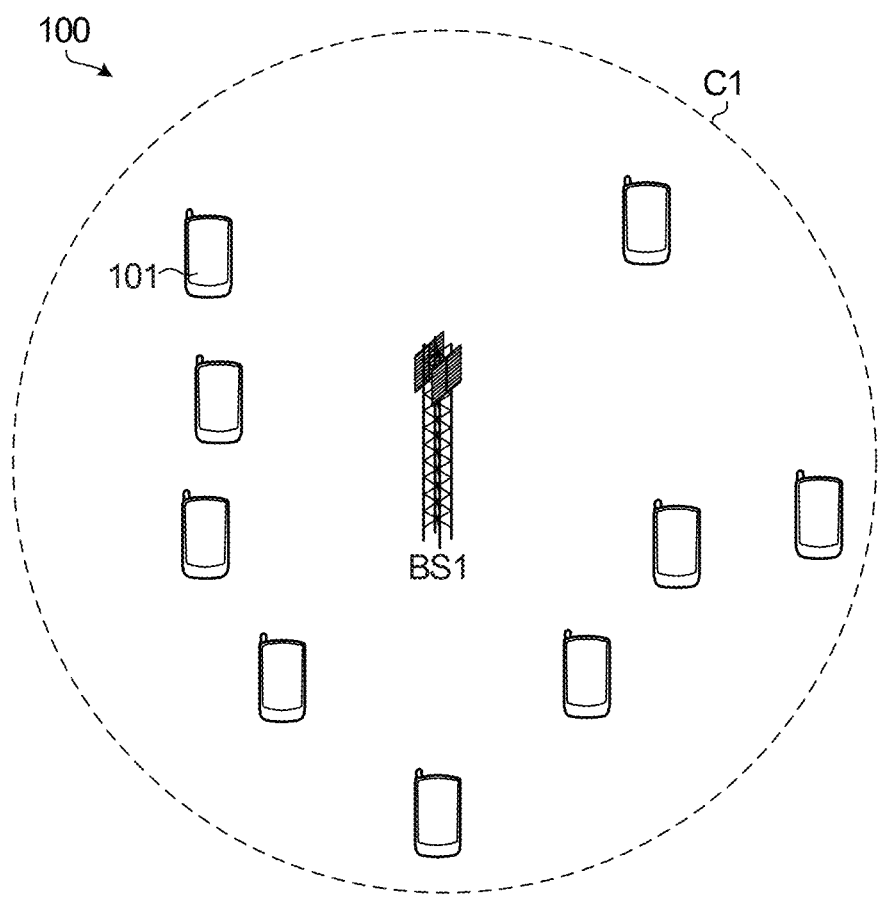
FIG. 1 is a block diagram of a radio access network showing a base station and corresponding UEs within a coverage area of the base station, in accordance with a non-limiting embodiment.

With reference to FIG. 1, there is shown a radio access network 100 that may be capable of supporting various non-limiting embodiments of the present invention. In particular, there is shown a base station BS1 that communicates with mobile user equipment (UEs including UE 101) using electromagnetic waves. The base station BS1 is connected to a core network (not shown) using, for example, fixed high-capacity links such as fiber optic links. Only one base station BS1 is shown for simplicity, but it should be understood that there is no particular limit on the number of base stations in the radio access network 100.

The base station BS1 communicates with the UEs in a coverage area C1 (sometimes also referred to as a cell) of the base station BS1. In the embodiment in FIG. 1, there is one coverage area C1 shown for simplicity, however it should be appreciated that there may be multiple coverage areas. Each coverage area may be associated with a respective base station. In this regard, as a UE migrates from one coverage area to another, communication switches over to the base station associated with the new coverage area using a process known as handoff. In some embodiments, a UE may communicate with base stations associated with more than one coverage area, depending on various operational factors.

The UEs can take on various forms. In one non-limiting embodiment, the UEs may be smartphones, tablets, laptops, vehicle-mounted communication devices, or a variety of such devices in different proportions throughout the radio access network. Each of the UEs is equipped with hardware, software and/or control logic to execute a variety of functions. For example, the UEs may be equipped with a radio frequency (RF) communication unit (including antenna(s), demodulator, processor, etc.) for establishing and/or maintaining a radio link with a base station. The UEs may further include a data decoder to decode symbols received from the RF communication unit into data streams and a data encoder to encode a data stream into symbols for transmission to the base station (e.g., the base station BS1) via the RF communication unit. The data streams themselves are processed by a computing device in each of the UEs. To this end, the computing device comprises a processor, a memory, one or more buses (e.g., data bus, control bus, etc.) and an I/O interface. The I/O interface, in addition to interfacing with the data encoder and data decoder, interfaces with a user of the corresponding UE via one or more input and/or output devices, such as a touch screen, a microphone, a loudspeaker, a keyboard, etc.

Figure 2:
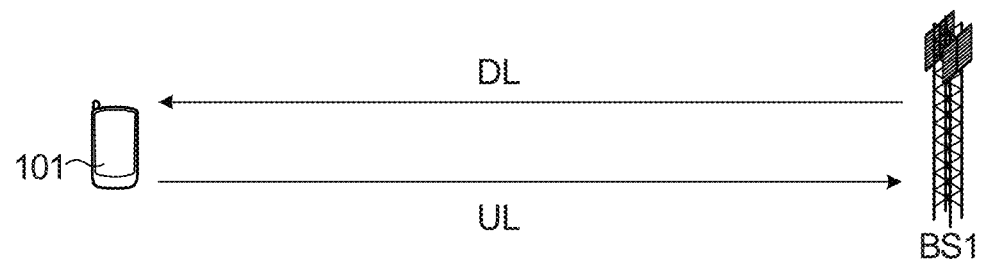
FIG. 2 illustrates uplink and downlink communication, in accordance with a non-limiting embodiment.

With additional reference to FIG. 2, communication from the base station BS1 to the UEs is referred to as downlink (DL) communication. Communication from the UEs to the base station is referred to as uplink (UL) communication.

The base station BS1 communicates with the UEs using resources that can be identified by "resource units" which can be time domain resource units, frequency-domain resource units and the sub domain resource units.

Figure 3:
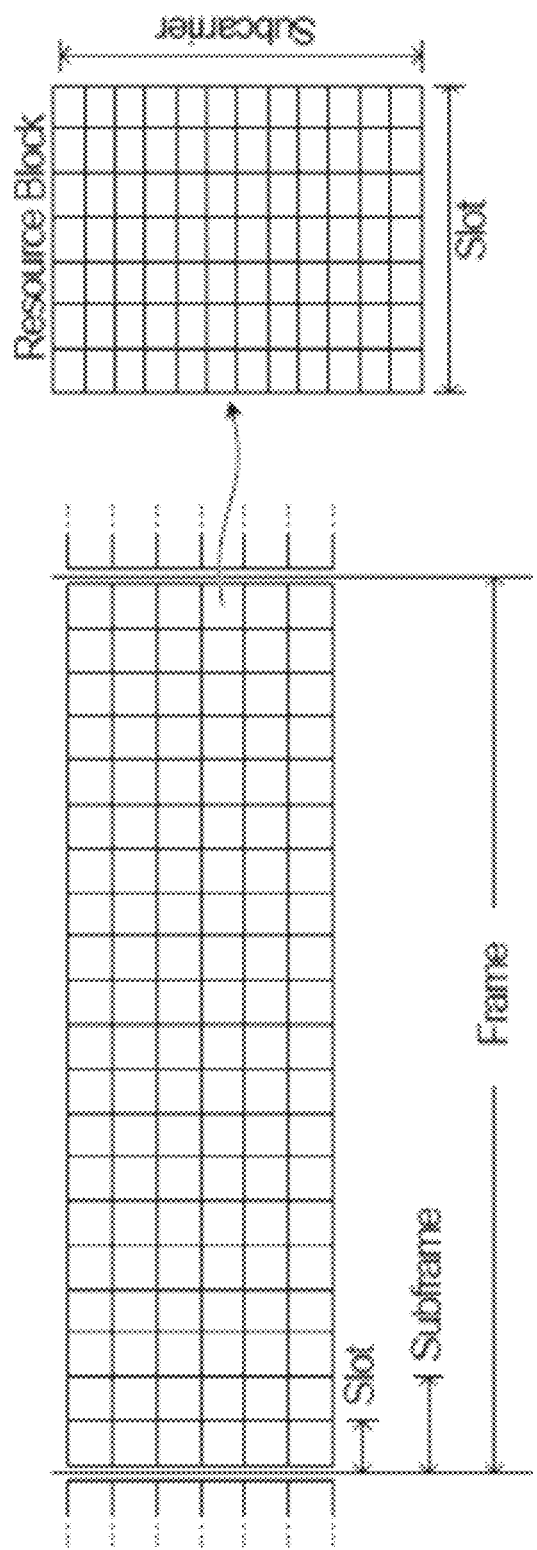
FIG. 3 schematically illustrates resource blocks, in accordance with a non-limiting embodiment.

With reference to FIG. 3, for example, a resource unit in the time domain can be defined as a time resource unit which can be at least one of system frame, subframe, time slot, mini-slot and OFDM symbol. A resource unit in the frequency domain can be defined as a frequency resource unit which can be at least one of sub-band, PRB (physical resource block), PRB set, PRG (PRB group), SC (sub-carrier) and bandwidth part (BWP). A resource unit in the sub domain can be defined as a sub resource unit which can be at least one of codebook/codeword, sequence, interleaver pattern, mapping pattern, demodulation reference signal, preamble and spatial, power, layer and port domain.

Generally, a "resource unit" refers to a resource which will be used for a data packet transmission based on at least one of one specific time resource unit (TRU) and/or one specific frequency resource unit (FRU) and/or one specific sub resource unit (SRU). Therefore, resource unit information defined for one resource unit can be index of at least one of time resource unit, and/or frequency resource unit, and/or sub resource unit.

A group of one or more resource units may be referred to as a "resource unit group" (RUG).

The resource units may be allocated to uplink (UL) and downlink (DL) communication between the base station BS1 and the UEs in various ways. For example, the UEs may transmit UL communication signals over certain designated resource units and the base station BS1 may transmit DL communication signals over certain other designated resource units. As such, the UL and DL communication signals may be separated in terms of frequency resource units, time resource units or in sub resource units, or may have overlapping frequency resource units, time resource units or sub resource units.

The UL and DL communication signals used to communicate between the base station BS1 and the UE 101 for the transportation of data may be implemented in various ways. For example, "channels" can be used to transport UL and DL data between the base station BS1 and the UE 101. Channels may be used to segregate different types of data and allow the transportation of data in a structured manner. For instance, physical channels (e.g., channels that carry user data and control messages), transport channels (e.g., channels that provide information transfer to Medium Access Control (MAC) and higher layers) and/or logical channels (e.g., channels that provide services for the MAC layer within the network protocol structure) may be used in some implementations.

The UL and DL communication signals used to communicate between the base station BS1 and the UE may also convey include control information, which may be used for synchronization and/or any other suitable purpose. Control signals conveying control information may be transmitted using specific and various subsets of the DL and UL resource units.

Reference is now made to a particular one of the UEs, for example the UE 101 (see FIG. 1). Prior to connecting to the network 100 via the base station BS1, the UE 101 searches for an available network. There is a possibility of there being multiple networks from different operators to which the UE 101 could possibly connect, and the UE 101 typically would synchronize to various frequencies from various networks and carry out an algorithm to determine the network to which the UE 101 will attempt to connect. Having selected a network to which to connect (in this case, network 100), the UE 101 carries out a synchronization process. During the synchronization process, the UE 101 may receive synchronization information from the base station BS1 in the network 100. The synchronization information may vary in different implementations. From the synchronization information, the UE 101 is able to determine information about the network 100, the base station BS1 and/or the coverage area C1.

After the initial cell synchronization, but before connecting to the network 100, the UE 101 may be able to obtain cell access-related parameters by further processing the DL communication signal it is receiving from the base station BS1. For example, The UE 101 may obtain random access channel (RACH) related parameters, physical uplink control channel (PUCCH) and physical uplink shared channel (PUSCH) configurations, and the like, from the DL communication signal prior to connecting to the network 100. In other words, the UE 101 may obtain resource unit information associated with an uplink data channel between the UE 101 and the base station BS1.

The process of the UE 101 connecting to the network 100 for the first time (e.g., after power-up) is known as a random access procedure. At this stage, UE 101 does not have any resource or channel available to inform the network 100 about its attempt to connect to the network 100, so the UE 101 may send a request over a shared UL communication channel. Because there is the possibility of other UEs in the same coverage area C1 sending their own requests to connect to the network at the same time and over the same sub-carriers, there is a possibility of collisions among the requests coming from the various UEs including the UE 101. When a random access procedure involves multiple UEs competing to connect to the base station BS1, this may be referred to as a "contention-based" random access procedure.

Figure 4:
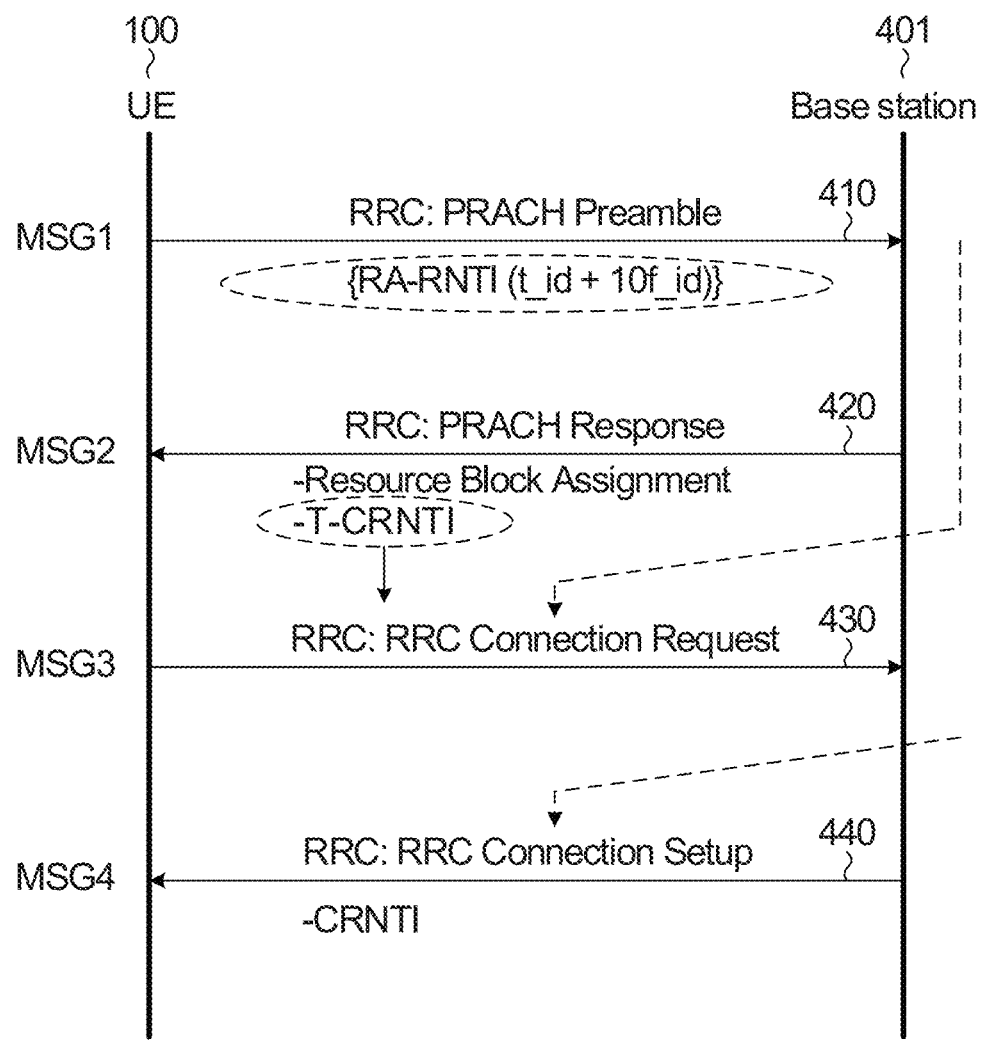
FIG. 4 illustrates communication signals in a physical random access procedure, in accordance with a non-limiting embodiment.

With reference now to FIG. 4, further details about the random access procedure are provided. Step 410 involves transmission of a message MSG1 from the UE 101 to the base station, hereinafter denoted by the reference numeral 401. The UE 101 may select, e.g., randomly, one of a number (e.g., 64) of available RACH preambles and may provide an identifier of the UE 101 to the network 100. The identity used by the UE 101 may be referred to as a "random access radio network temporary identifier" (RA-RNTI). The RA-RNTI can be determined from the time resource unit, and/or frequency resource unit occupied by the RACH preamble. For example, the RA-RNTI may be determined as follows: RA-RNTI=1+t_id+10*f_id, where t_id ($0 \leq$ t_id<10) is the index of the first sub-frame of the specified physical random access channel (PRACH) being used to transmit message MSG1, and f_id ($0 \leq$ f_id<6) is the index of the frequency resource unit of the specified PRACH. It should be appreciated that the RA-RNTI may be used for identifying group random access response (RAR) reception by masking a downlink control indicator (DCI).

At step 420, the base station 401 determines the RA-RNTI from the time resource unit and frequency resource unit that were used to send the preamble. The base station 401 sends a random access response (referred to as MSG2) on a DL shared channel. MSG2 is addressed to the RA-RNTI that was determined by the base station 401. MSG2 may include information such as a temporary cell RNTI (T-CRNTI), which gives another identity to the UE 101 for further communication. MS2 may also identify granted UL resources, such as a resource block assignment, so that the UE 101 can use the UL shared channel. The T-CRNTI may be used for identifying preamble reception, for identifying the PUSCH (e.g., MSG3, discussed below) transmission by scrambling, and/or for identifying the physical DL shared channel (PDSCH) (e.g., MSG4, discussed below) response by masking the DCI.

Step 430 involves transmission of a message MSG3 from the UE 101 to the base station 401. Using the UL shared channel, the UE 101 sends an RRC connection request message which includes an identifier for identifying the UE 101 to the base station 401. The identifier may be a random value (e.g., if the UE 101 is connecting to the network 100 for the first time) or a known identifier (e.g., if the UE 101 has previously connected to the network 100).

Step 440 involves transmission of a message MSG4 from the base station 401 to the UE 101. Specifically, the base station 401 responds to receipt of message MSG3 with a connection setup message (message MSG4) that includes the identifier of the UE 101, discussed in step 430, and a new C-RNTI, which can be used for further communication and may be used to identify channels and signals in the UL and DL communication.

It should be appreciated that the present disclosure is generally concerned with a grant-free process that bypasses, avoids or lacks scheduling/grant mechanisms, such as the scheduling and grant mechanism described above with reference to FIG. 4.

Figure 5A:
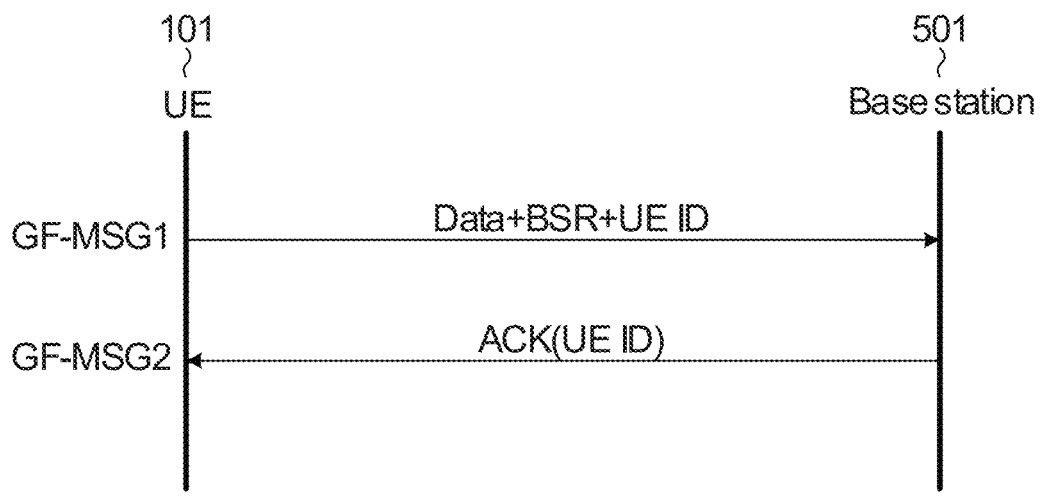
FIGS. 5A and 5B illustrate communication signals in a grant-free transmission and reception process, in accordance with non-limiting embodiments.
Figure 5B:
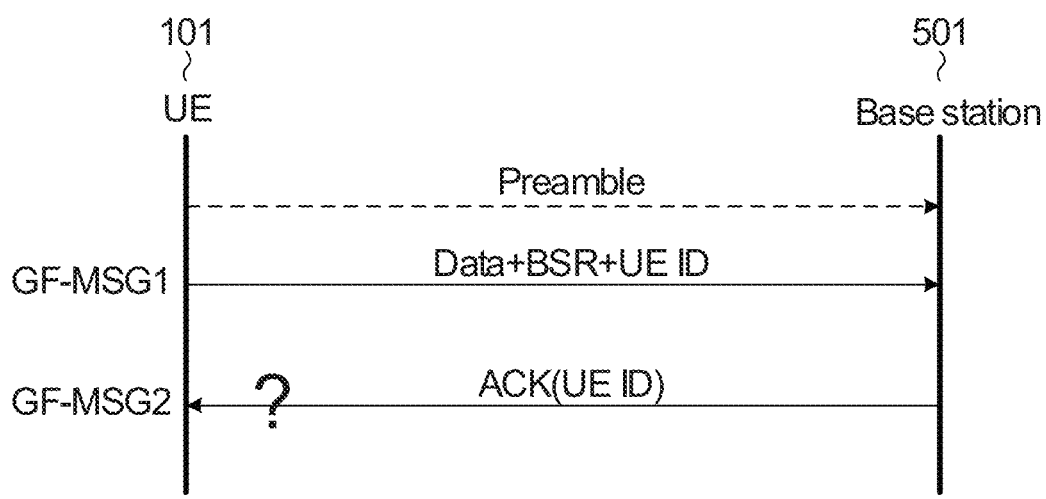

With reference to FIGS. 5A and 5B, examples of contention-based grant-free transmission and reception processes are provided.

It should be appreciated that establishing grant-free communication may be a two-step process. For example, after obtaining initial cell synchronization and determining information about the network, such as parameters relating to the RACH, PUCCH and PUSCH configurations, the UE 101 may transmit a message GF-MSG1 to the base station 501. The base station 501 may respond with a message GF-MSG2 to the UE 101 to establish grant-free communication. Herein message GF-MSG1 may include a preamble transmitted on a PRACH resource unit and/or uplink data transmitted on a PUSCH resource unit.

In general terms, message GF-MSG1 transmitted from the UE 101 to the base station 501 is used to identify the UE 101 to the base station 501, and message GF-MSG2 transmitted from the base station 501 to the UE 101 is used to acknowledge that the UE 101 may communicate with the base station 501. Accordingly, message GF-MSG2 may be referred to as an ACK message or a downlink response message. The specifics of message GF-MSG1 transmitted from the UE 101 to the base station 501 and of message GF-MSG2 received at the UE 101 from the base station 501 to establish grant-free communication will be described in further detail in the example embodiments discussed elsewhere in this document.

Message GF-MSG1 may include or encode a "grant-free radio network temporary identifier" (GF-RNTI). The UE 101 may apply one or more rules to determine the GF-RNTI. For example, after obtaining parameters relating to the resource unit information from the base station 501 (e.g., parameters relating to the RACH, PUCCH and/or PUSCH configurations, etc.), the UE 101 may determine the GF-RNTI according to one or more rules. The GF-RNTI is a general identifier which may be further specifically defined for use in different scenarios of grant-free PUSCH transmission. For example, different GF-RNTIs may be used for scrambling of data transmitted on the PUSCH, masking of a CRC transmitted on the physical downlink control channel (PDCCH) and/or scrambling for PDCCH/physical downlink shared channel (PDSCH).

The base station 501 has the capability to determine the GF-RNTI from the resources used for message GF-MSG received from the UE 101. As such, the GF-RNTI will be known by both the UE 101 and the base station 501.

With additional reference to FIG. 6, a table of examples of possible cases for constructing grant-free transmission and reception messages using the GF-RNTI is provided. For example, the resources used in the transmission of message GF-MSG1 from the UE 101 to the base station 501 for the PUSCH may allow determination of the GF-RNTI wherein message GF-MSG1 includes uplink data transmitted on a PUSCH resource unit. Alternatively, the resources used in the transmission of message GF-MSG1 from the UE 101 to the base station 501 for the PRACH and/or the PUSCH may allow determination of the GF-RNTI wherein message GF-MSG1 includes both preamble transmitted on PRACH resource unit and uplink data transmitted on PUSCH resource unit and the PRACH is associated with the PUSCH. The preamble may optionally be transmitted as part of the message GF-MSG1 from the UE 101 to the base station 501, and may be used in the determination of the GF-RNTI. Also, as mentioned above, the GF-RNTI may be used by the UE 101 to scramble data transmitted on the PUSCH.

It should be appreciated that multiple UEs may transmit on the same time-frequency resource unit(s) used for PUSCH transmission. As such, the GF-RNTI may be common to a group of UEs or may be UE-specific (or resource unit specific i.e., specific to a single UE such as the UE 101 or the specific resource unit). Similarly, the GF-RNTI that the base station 501 uses to mask/scramble the DL response message GF-MSG2 may be common to a group of UEs or may be UE-specific. Since it is known by the UE 101, the GF-RNTI may be used by the UE 101 to the DL response message GF-MSG2.

Several example techniques for determining the GF-RNTI will now be described in greater detail.

Example Technique 1-1: GF-RNTI Determined from PUSCH Resource Unit Information

In this example, the GF-RNTI may be determined from the resource unit information of an uplink data channel (namely the PUSCH). This resource unit information includes at least one of frequency resource unit information, time resource unit information and/or sub resource unit information" that the UE 101 uses to transmit message GF-MSG1 to the base station 501 on the PUSCH:

The frequency resource unit information may include at least one of subband index, a physical resource block (PRB) index, a PRB set index, a PRG index, a SC (sub-carrier) index and a BWP (bandwidth part) index. The frequency resource unit information may be referred to by an index denoted F_id.

The time resource unit information may include at least one of a system frame index, a sub-frame index, a slot index and a mini-slot index. The time resource unit information may be referred to by an index denoted T_id.

The sub resource unit information may include at least one of a codebook/codeword index, a sequence index, an interleaver pattern index, mapping pattern index, a demodulation reference signal index, a preamble index, a spatial-dimension index, a power-dimension index, a layer index and/or a port index. The sub resource unit information may be denoted SRU_id.

PUSCH resource unit information (for at least one of time resource unit, frequency resource unit and sub resource unit) can be explicitly configured or indicated by at least one of the broadcasting channel and dedicated semi-static channel (RRC). Moreover, PUSCH resource unit information (for at least one of time resource unit, frequency resource unit and sub resource unit) can be randomly selected from a resource unit group which is explicitly configured or indicated by at least one of the broadcasting channel and dedicated semi-static channel (RRC).

The UE 101, as the transmitter of message GF-MSG1, may determine the GF-RNTI based on the resource unit information it has selected to use to transmit message GF-MSG1 on the PUSCH, and according to one or more rules for combining this information into an actual GF-RNTI. In the present example, the GF-RNTI is a function of one or more of the frequency resource unit information, time resource unit information, and sub resource unit information (e.g., GF-RNTI=f(T_id, F_id, SRU_id)). Depending on the embodiment, the resource unit information from which the GF-RNTI is determined may be associated with a single resource unit or with a resource unit group.

As the receiver of message GF-MSG1, the base station 501 may determine the GF-RNTI from the resource unit information corresponding to the resources that were configured to transmit message GF-MSG1 on the PUSCH. The GF-RNTI may thus be determined by both entities (the UE 101 and the base station 501) because predetermined sets of time resource unit information, frequency resource unit information and/or sub resource unit information are used.

For instance, the sub resource unit information SRU_id can be selected by the UE 101 (e.g., randomly) from a sub resource unit index set which is associated with maximum Ns_max sub resource units defined for a given time-frequency resource unit. Ns_max can be predefined or specified by the base station 501 via a broadcast channel and/or dedicated channel.

Considering now the case of multiple (e.g., two) UEs with identifiers ID1 and ID2, these two UEs may use the same time-frequency resource unit.

Figure 7A:
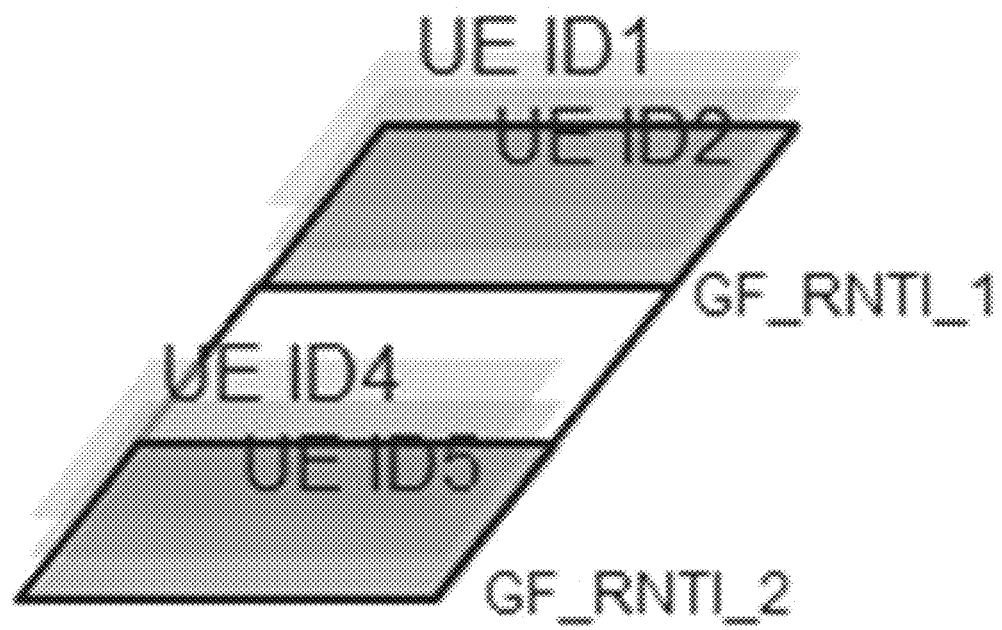
FIGS. 7A, 7B, 8A and 8B illustrate multiplexing of grant-free radio network temporary identifiers (GF-RNTIs) in various resource blocks, in accordance with non-limiting embodiments.

In one example, the two UEs determine a common GF-RNTI (referred to as a "first type" GF-RNTI in this document). This "first type" GF-RNTI can be expressed as $1+(Nt\_max*F\_id)+T\_id$, where Nt_max is the maximum number for time resource units during one time interval (e.g. one system frame). For instance, as shown in FIG. 7A, two UEs with identifiers ID1 and ID2, respectively, both use the same time-frequency resource unit to determine a common "first type" GF-RNTI identified as GF_RNTI_1. Similarly, two UEs with identifiers ID4 and ID5, respectively, both use the same time-frequency resource unit to determine a common "first type" GF-RNTI identified as GF_RNTI_2.

In another example, these same two UEs determine a UE-specific GF-RNTI (referred to as a "second type" GF-RNTI in this document). This "second type" GF-RNTI can be $1+((Nt\_max*Ns\_max)*F\_id)+(Ns\_max*T\_id)+SRU\_id$, where Nt_max is, as before, the maximum number of time resource units during one time interval (e.g. one system frame), and where SRU_id is sub resource unit information unique to each UE (or sub resource unit). The following table illustrates possible ranges of the calculated GF-RNTI for different values of F_id, T_id and SRU_id:

| | |
|---|---|
| 40~49 (F_id = 2, T_id = 0, SRU_id = 0~9) | 50~59(F_id = 2, T_id = 1, SRU_id = 0~9) |
| 20~29(F_id = 1, T_id = 0, SRU_id = 0~9) | 30~39(F_id = 1, T_id = 1, SRU_id = 0~9) |
| 0~9(F_id = 0, T_id = 0, SRU_id = 0~9) | 10~19(F_id = 0, T_id = 1, SRU_id = 0~9) |

Figure 7B:
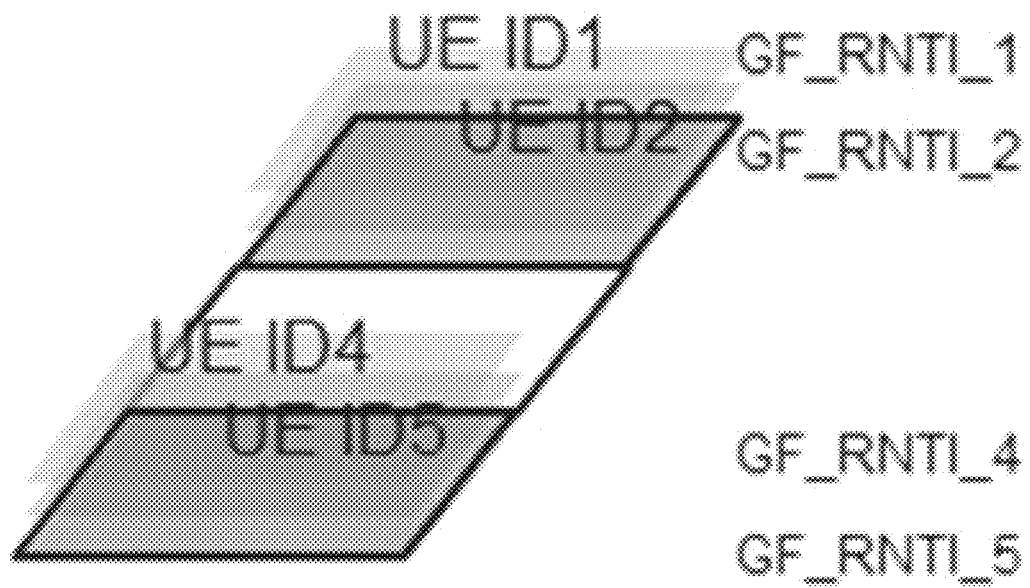

Multiple UEs' GF-RNTIs may be multiplexed within one time-frequency resource unit. The multiplexing can be done in different ways. For example, as shown in FIG. 7B, two UEs with identifiers ID1 and ID2, respectively, both use the same time-frequency resource unit to determine separate specific GF-RNTIs identified as GF_RNTI_1 and GR_RNTI_2, respectively. Similarly, two UEs with identifiers ID4 and ID5, respectively, both use the same time-frequency resource unit to determine separate specific GF-RNTIs identified as GF_RNTI_4 and GF_RNTI_5, respectively.

In the case illustrated in FIG. 7B, for example, two UEs may use the same time-frequency resource unit, and different GR-RNTIs can be multiplexed in the same time-frequency resource unit by using different sub resource unit information. It should be appreciated that the sub resource unit information may be used to make a GF-RNTI resource specific to a particular UE.

The UEs may scramble data transmitted on the UL data channel (e.g., the PUSCH) with the GF-RNTI. Example techniques for scrambling data transmitted on the PUSCH with GRGF-RNTI are discussed elsewhere in this document (see, for instance, example technique 2-1, herein below).

Figure 10A:
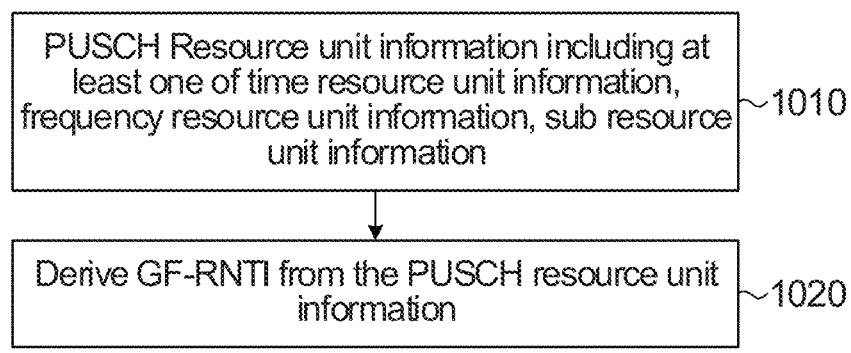
FIGS. 10A and 10B illustrate flowcharts for determining a grant-free radio network identifier (GF-RNTI), in accordance with non-limiting embodiments.

Thus, it will be appreciated that in accordance with a specific and non-limiting example of implementation (see also FIG. 10A), the UE 101 and/or the base station 501 carries out a method of determining the GF-RNTI by obtaining resource unit information of the uplink data channel between the UE and the base station 501 (step 1010). The resource unit information includes at least one of frequency resource unit information, time resource unit information and sub resource unit information. The UE 101 and/or the base station 501 proceeds to determine the GF-RNTI at least in part from the resource unit information (step 1020). The UE 101 then utilizes the GF-RNTI for grant-free communication between itself and the base station 501. The GF-RNTI may be determined for a group of UEs or individual GF-RNTIs may be determined for specific UEs.

Example Technique 1-2: GF-RNTI Determined from PRACH Resource Unit Information

In this example, the GF-RNTI may be determined from PRACH resource unit information (which can be at least one of the time resource unit information t_id and/or frequency resource unit information f_id and sub resource unit information (e.g., preamble index) Pr_id). The PRACH resource unit information may also include the RA-RNTI, determined from both PRACH time resource unit information (denoted t_id) and PRACH frequency resource unit information (denoted f_id) as follows, by way of non-limiting example: RA_RNTI=1+(10*f_id)+t_id. The preamble sequence information Pr_id may be one of a number (e.g., 64) of maximum available RACH preambles defined for each PRACH time-frequency resource unit. Optionally, the PUSCH resource unit information may also be used in determining the GF-RNTI in this example technique.

PRACH resource unit information (for at least one of time resource unit, frequency resource unit and sub resource unit) can be explicitly configured or indicated by at least one of the broadcasting channel and dedicated semi-static channel (RRC). Moreover, PRACH resource unit information (for at least one of time resource unit, frequency resource unit and sub resource unit) can be randomly selected from a resource unit group which is explicitly configured or indicated by at least one of the broadcasting channel and dedicated semi-static channel (RRC).

In particular, the UE 101 may determine the GF-RNTI based on PRACH resource unit information (RA-RNTI), as well as based on one or more rules for combining this information into a GF-RNTI. The base station 501 may determine the GF-RNTI PRACH resource unit information (RA-RNTI), as well as based on these same one or more rules. In the present example, the GF-RNTI is a function of one or more of time resource unit, frequency resource unit and sub resource unit (e.g., GF-RNTI=f(t_id, fid, Pr_id)). In a specific and non-limiting implementation, the GF-RNTI may be used to identify a resource unit group and/or a resource unit. Optionally, the PUSCH resource unit information may also be used in determining the GF-RNTI in this example technique. Depending on the embodiment, the resource unit information from which the GF-RNTI is determined may be associated with a single resource unit or with a resource unit group.

Figure 8A:
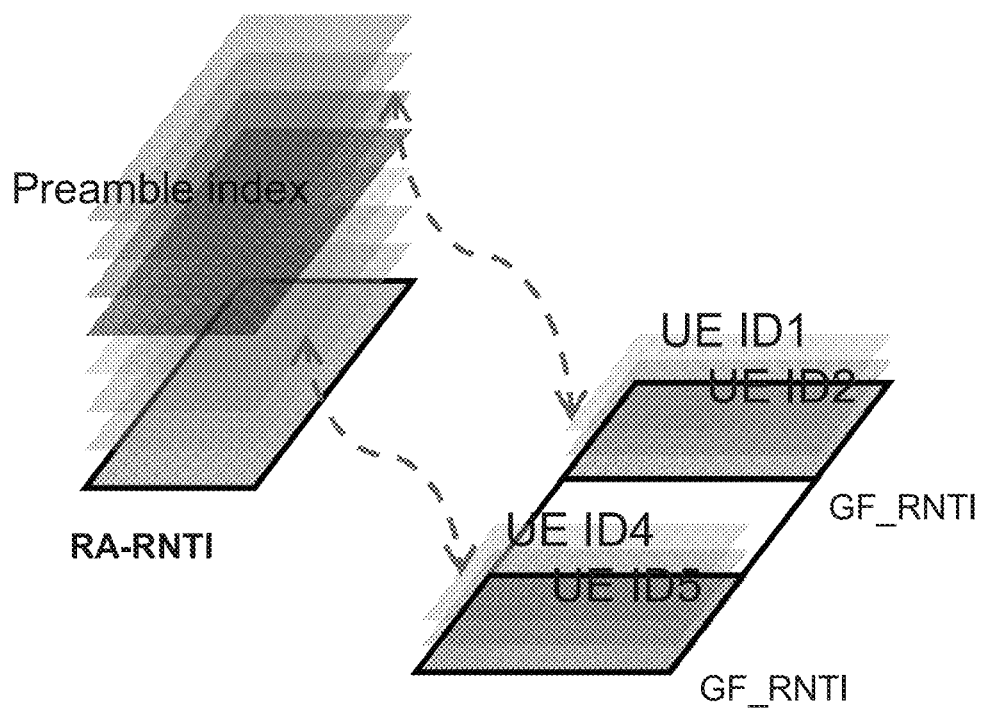

The GF-RNTIs of multiple UEs may be multiplexed within one time-frequency resource unit wherein multiple UEs may use different PRACH resource unit which can be different from at least one of the time resource unit information t_id, frequency resource unit information f_id and sub resource unit Pr_id. The multiplexing can be done in different ways, as now described with reference to FIGS. 8A and 8B. As shown in FIG. 8A, four UEs with identifiers ID1, ID2, ID4 and ID5 respectively, all use the same PRACH time-frequency resource unit information (i.e.,g RA-RNTI) to determine a common GF-RNTI (referred to as a "third type" GF-RNTI in this document). In an embodiment, the common "third type" GF-RNTI can correspond to the RA_RNTI (GF_RNTI=RA_RNTI).

Figure 8B:
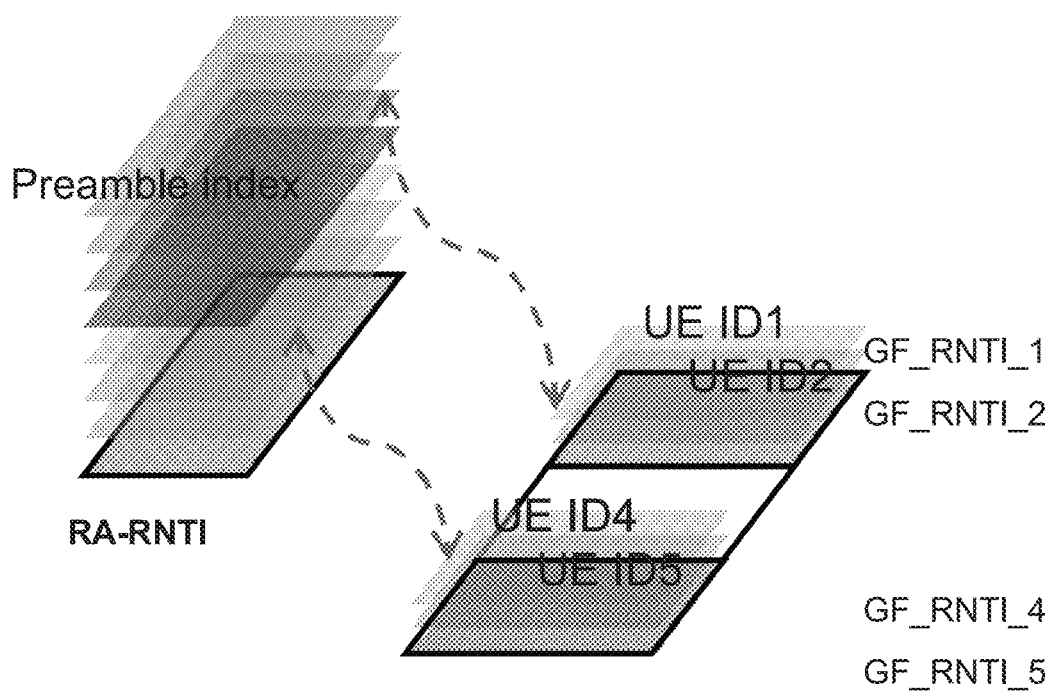

In FIG. 8B, these four UEs with identifiers ID1, ID2, ID4 and ID5, respectively, may use different PRACH resource units (which can be a different in terms of the time resource unit information t_id, frequency resource unit information fid and/or sub resource unit information Pr_id) to determine separate specific GF-RNTI (referred to as the "fourth type" GF-RNTI in this document) identified as GF_RNTI_1 GR_RNTI_2, GF_RNTI_4 and GF_RNTI_5, respectively. For example, each GF-RNTI can be determined from the RA-RNTI as follows: GF-RNTI_(j)=Npr_Max*RA-RNTI+Pr_id where Npr_Max is the maximum number preamble sequence defined for each PRACH resource and Pr_id corresponds to UE. The UEs may also scramble the data transmitted on the UL data channel (e.g., the PUSCH) with the GF-RNTI. Example techniques for scrambling data transmitted on the PUSCH with GF-RNTI are discussed elsewhere in this document (see, for instance, example technique 2-2 herein below).

Figure 10B:
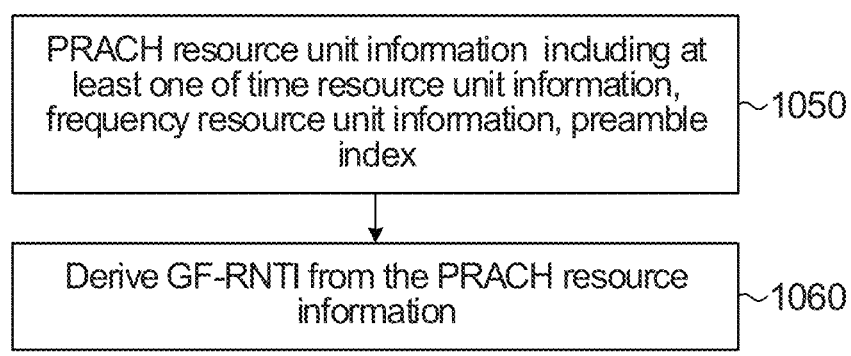

Thus, it will be appreciated that in accordance with a specific and non-limiting example of implementation (see FIG. 10B), the UE 101 and/or the base station 501 carries out a method of determining the GF-RNTI. The method includes obtaining PRACH resource unit information associated with the uplink data channel between the UE 101 and the base station 501 (step 1050). The PRACH resource unit information includes at least one of frequency resource unit information, time resource unit information and sub resource preamble sequence information. The method further includes the UE 101 and/or the base station 501 determining the GF-RNTI from the PRACH resource unit information (step 1060). (Optionally, the PUSCH resource unit information may also be used in determining the GF-RNTI in this example technique) The method also includes the UE 101 using the GF-RNTI for grant-free communication between itself and the base station 501. The GF-RNTI may common to a group of UEs ("third type" GF-RNTI) or specific to an individual UE ("fourth type" GF-RNTI).

Example Technique 2-1: Scrambling Data Transmitted on the PUSCH with GF-RNTI Determined from PUSCH Resource Unit Information In an embodiment, the UE 101 may be equipped with a scrambling unit for scrambling uplink data to be transmitted on the PUSCH. The scrambling unit utilizes a scrambling sequence generator. The scrambling sequence generator can be initialized with a seed, such as $c_{init}=n_{GF\text{-}RNTI} \cdot 2^{14}+q \cdot 2^{13}+\lfloor n_s/2 \rfloor \cdot 2^9 + N_{ID}^{cell}$ where q is the codeword index, $n_s$, can be a time unit index and $N_{ID}^{cell}$ is a physical cell ID. Also, in this example, $n_{GF\text{-}RNTI}$ corresponds to the GF-RNTI defined from example technique (1-1). In particular, the GF-RNTI may be determined from PUSCH resource unit information which includes at least one of a frequency resource unit information index F_id, a time resource unit information index T_id and sub resource unit information SRU_id.

It should be appreciated that two UEs with different identifiers using the same time-frequency resource unit can determine one common GF-RNTI (it is recalled that this is referred to as the "first type" GF-RNTI), which can correspond to 1+Nt_max*F_id+T_id.

Alternatively, UEs with different identifiers using the same time-frequency resource unit can determine separate specific GF-RNTIs (it is recalled that this is referred to as the "second type" GF-RNTI), which can correspond to 1+((Nt_max*Ns_max)*F_id)+(Ns_max*T_id)+SRU_id, where Nt_max is the maximum number for time resource unit during one time interval (e.g. one system frame) and SRU_id is specific to each of the UEs.

As noted above, the UE may scramble data transmitted on the PUSCH with the GF_RNTI. For example, as shown in FIG. 7A, UEs with identifiers ID1 and ID2 may each scramble message GF-MSG1 on the PUSCH with a common GF-RNTI denoted GF_RNTI_1. Because the same GF-RNTI is used in this example by multiple UEs, it should be appreciated that the GF-RNTI is common to a group of UEs.

By way of another example, as shown in FIG. 7B, each of the UEs utilizes a specific GF-RNTI. In this case, message GF-MSG1 transmitted on the PUSCH may be scrambled with GF-RNTIs specific to each of the UEs.

The base station 501 receives scrambled message GF-MSG1 on the PUSCH and then descrambles it using the same GF-RNTI associated to specific PUSCH resource unit information which will be associated with at least one of frequency resource unit information index F_id, time resource unit information index T_id, and sub resource unit information SRU_id. For each sub resource unit, there will be an associated GF-RNTI, possibly only a single one.

Upon detecting the PUSCH transmission, the base station 501 can then use the GF-RNTI to alter data to be transmitted on the DL channel(s) (e.g., physical downlink control channel (PDCCH) and/or PDSCH) to provide message GF-MSG2 to the UE 101. Altering the data may include masking of the CRC and/or scrambling of some or all of the data transmitted on the PDCCH and/or PDSCH.

Figure 11A:
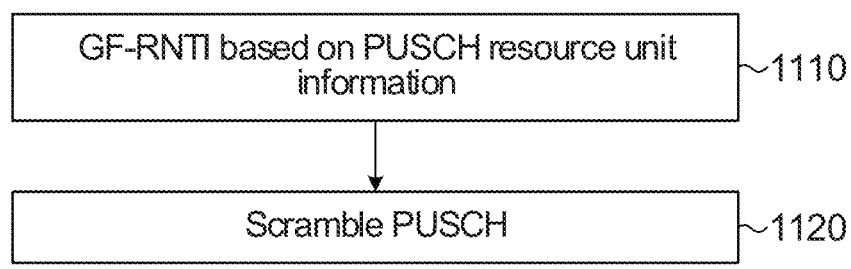
FIGS. 11A and 11B illustrate flowcharts for scrambling data on an uplink channel, in accordance with non-limiting embodiments.

Thus, it will be appreciated that in accordance with a specific and non-limiting example of implementation (see also FIG. 11A), the UE 101 carries out a method of altering data transmitted on the PUSCH by (i) determining the GF-RNTI (step 1110) as described above and (ii) scrambling the data transmitted on the PUSCH using the GF-RNTI (step 1120).

Example Technique 2-2: Scrambling Data Transmitted on the PUSCH with GF-RNTI Determined from PRACH Resource Unit Information As previously mentioned, the UE 101 may be equipped with a scrambling unit for scrambling data to be transmitted on the PUSCH. The scrambling unit utilizes a scrambling sequence generator. The scrambling sequence generator can be initialised with a seed, such as $c_{init} = n_{GF-RNTI} \cdot 2^{14} + q \cdot 2^{13} + \lfloor n_s/2 \rfloor \cdot 2^9 + N_{ID}^{cell}$ where q is the codeword index, $n_s$ can be a time unit index and $N_{ID}^{cell}$ is a physical cell ID. Also in this example, $n_{GF-RNTI}$ corresponds to the GF-RNTI defined from the example technique (1-2). In particular, the GF-RNTI may be determined from PRACH resource unit information which includes at least one of frequency resource unit information, time resource unit information and sub resource unit information.

It should be appreciated that two UEs with different identifiers using the same PRACH time-frequency resource unit information (i.e., same RA-RNTI) but different sub resource unit can determine one common GF-RNTI (it is recalled that this is referred to as the "third type" GF-RNTI), which can correspond to RA-RNTI.

Alternatively, UEs with different identifiers using the same PRACH time-frequency resource unit information (i.e., same RA-RNTI) but different sub resource unit information can determine separate specific GF-RNTIs it is recalled that this is referred to as the "fourth type" GF-RNTI), which can correspond to ((Npr_Max*RA-RNTI)+ Pr_id) where Npr_Max is the maximum number (e.g., 64) of sub resource unit (e.g., preamble) defined for each PRACH time-frequency resource unit.

As noted above, the UE may scramble data transmitted on the PUSCH with the GF_RNTI. For example, as shown in FIG. 8A, the UEs with ID1, ID2, ID4 and ID5 having same PRACH time-frequency resource unit but different sub resource unit may each scramble data transmitted on the PUSCH with one common GF_RNTI. Because the same GF-RNTI is used in this example by multiple UEs, it should be appreciated that the GF-RNTI is common to a group of UEs. By way of another example, as shown in FIG. 8B, each of the UEs has a specific GF-RNTI. In this case, data transmitted on the PUSCH may be scrambled by specific GF-RNTI.

The base station 501 receives scrambled message GF-MSG2 on the PUSCH and then descrambles it using the same GF-RNTI which will be associated with RACH resource unit information which includes at least one of frequency resource unit information, time resource unit information and sub resource unit information. For each sub resource unit, there will be only one associated GF-RNTI.

Upon detecting the PUSCH transmission, the base station 501 can then use the GF-RNTI to alter data to be transmitted on the DL channel(s) (e.g., physical downlink control channel (PDCCH) and/or PDSCH) to provide message GF-MSG2 to the UE 101. Altering the data may include masking of the CRC and/or scrambling of some or all of the data on the channel.

Figure 11B:
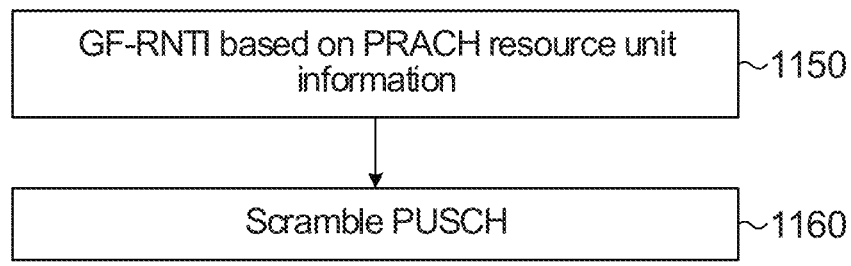

Thus, it will be appreciated that in accordance with a specific and non-limiting example of implementation (see also FIG. 11B), the UE 101 carries out a method of altering data transmitted on the PUSCH by (i) determining the GF-RNTI (step 1150) as described above and (ii) scrambling the data transmitted on the PUSCH using the GF-RNTI (step 1160).

Example Technique 3-1: Scrambling and/or Masking Data Transmitted on the PDCCH and/or the PDSCH with GF-RNTI Determined from PUSCH Resource Unit Information In this example, the base station 501 uses one or more GF-RNTIs to alter data transmitted on the PDCCH and/or the PDSCH by scrambling and/or masking. Here, the GF-RNTIs can be determined from the PUSCH resource unit information including at least one of frequency resource unit information (indexed by F_id), time resource unit information (indexed by T_id), and sub resource unit information SRU_id.

According to example technique 3-1, for one UE, the GF-RNTI used to scramble and/or mask the data transmitted on the PDCCH and/or on the PDSCH can be the same as, or different from, the GF-RNTI used to scramble the data on the PUSCH.

A first specific implementation of example technique 3-1 involves (i) scrambling data transmitted on the PUSCH with a "first type" GF-RNTI and (ii) masking data transmitted on the PDCCH and scrambling data transmitted on the PDSCH with the same "first type" GF-RNTI for each UE. In this case, the downlink uses a common feedback solution. That is, the "first type" GF-RNTI may be a common group GF-RNTI that may be used for a group response relating to grant-free transmissions.

A second specific implementation of example technique 3-1 involves (i) scrambling data transmitted on the PUSCH with a "second type" GF-RNTI and (ii) masking data transmitted on the PDCCH and scrambling data transmitted on the PDSCH with a "first type" GF-RNTI for each UE. Again, the downlink uses a common feedback solution. That is, the "first type" GF-RNTI may be a common group GF-RNTI that may be used for a group response relating to grant-free transmissions.

A third specific implementation of example technique 3-1 involves (i) scrambling data transmitted on the PUSCH with a "second type" GF-RNTI and (ii) masking data transmitted on the PDCCH and scrambling data transmitted on the PDSCH with the same "second type" GF-RNTI for each UE. In this case, the downlink uses a UE-specific feedback solution. That is, the "second type" GF-RNTI may be a UE-specific GF-RNTI that may be used for a UE-specific response relating to grant-free transmissions.

A fourth specific implementation of example technique 3-1 involves (i) scrambling data transmitted on the PUSCH with a "first type" GF-RNTI and (ii) masking data transmitted on the PDCCH and scrambling data transmitted on the PDSCH with the "second type" GF-RNTI for each UE. Again, the downlink uses a UE-specific feedback solution. That is, the "second type" GF-RNTI may be a UE-specific GF-RNTI that may be used for a UE-specific response relating to grant-free transmissions.

The first through fourth specific implementations of example technique 3-1 are further represented in the following Table 1:

TABLE 1

| GF-RNTI for UL/DL based on PUSCH resource unit information | |
|---|---|
| GF-RNTI for PUSCH | GF-RNTI for PDCCH/PDSCH |
| First type GF-RNTI | First type GF-RNTI |
| First type GF-RNTI | Second type GF-RNTI |
| Second type GF-RNTI | First type GF-RNTI |
| Second type GF-RNTI | Second type GF-RNTI |

A fifth specific implementation of example technique 3-1 involves masking data transmitted on the PDCCH and scrambling data transmitted on the PDSCH with the "second type" GF-RNTI specific to the UE. In this case, a dedicated UE identifier (ID) may be carried in the response with DCI information bits. For example FIG. 9A illustrates an example of the DCI format. In this case, there is a one-to-one mapping of the GF-RNTI to the UE 101, such that two UEs selecting the same sub resource unit within one same time-frequency resource unit will have the same GF-RNTI. The UE-specific search space associated to the second type GF-RNTI may be monitored by the UE 101. The UE 101 may de-mask the data on the PDCCH and, after successfully decoding the de-masked data on the PDCCH, may find the related response message GF-MSG2.

A sixth specific implementation of example technique 3-1 involves scrambling only the data transmitted on the PDSCH with the specific "second type" GF-RNTI for a UE-specific response to grant-free transmission. In this case, the dedicated UE ID occupies PDSCH information bits. As such, in this example, the feedback from the base station 501 to the UE 101 only involves the PDSCH. A predefined specific resource allocation for PDSCH associated with the "second type" GF-RNTI and blind detection may be used. For instance, FIG. 9B illustrates an example of a downlink slot including the UE ID and scrambling with GF-RNTI (which in this embodiment may be the "second type" GF-RNTI).

Depending on the implementation (e.g., first through sixth), the UE 101 may descramble and/or de-mask the data on the PDCCH and/or PDSCH with the "first type" GF-RNTI or the "second type" GF-RNTI to obtain the message GF-MSG2 containing acknowledgement and/or response that the UE 101 may communicate in a grant-free manner.

Figure 12A:
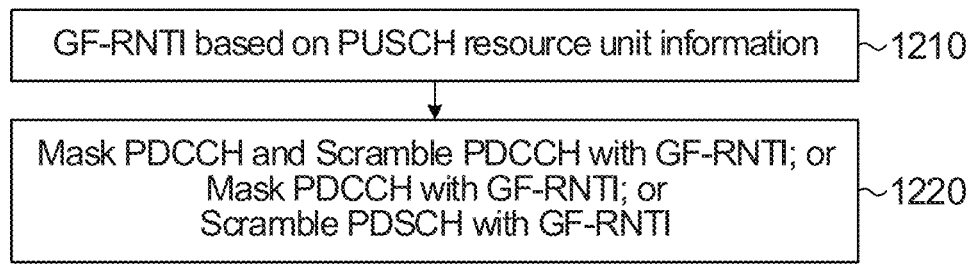
FIGS. 12A and 12B illustrate flowcharts for processing data on a downlink channel, in accordance with non-limiting embodiments.
Figure 12B:
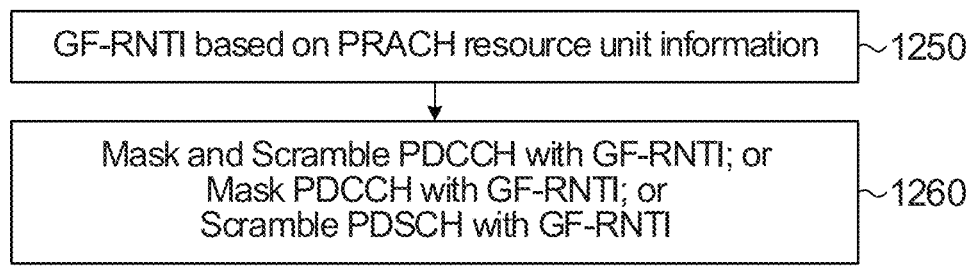

Thus, it will be appreciated that in accordance with a specific and non-limiting example of implementation (see FIG. 12B), the base station 501 carries out a method of altering data transmitted on a physical downlink channel. The method includes deriving the GF-RNTI from the uplink data channel resource unit information between at least one user equipment (UE) and the base station 501 (step 1210), the GF-RNTI being common to a group of UEs or specific to each UE; and using the GF-RNTI to alter the data transmitted on the physical downlink channel (step 1220). Altering of data transmitted on the physical downlink channel may include masking the data transmitted on the PDCCH with at least the GF-RNTI and/or scrambling the data transmitted on the PDSCH with at least the GF-RNTI.

Example Technique 3-2: Scrambling and/or Masking Data Transmitted on the PDCCH and/or on the PDSCH with GF-RNTI Determined from PRACH Resource Unit Information In this example, the base station 501 uses one or more GF-RNTIs to alter data transmitted on the PDCCH and/or the PDSCH by scrambling and/or masking. Here, the GF-RNTIs can be determined from at least one of PRACH resource unit information which includes at least one of frequency resource unit information, time resource unit information and sub resource unit information.

According to example technique 3-2, for one UE, the GF-RNTI used to scramble and/or mask the data transmitted on the PDCCH and/or on the PDSCH can be the same as, or different from, the GF-RNTI used to scramble the data on the PUSCH.

A first specific implementation of example technique 3-2 involves (i) scrambling data transmitted on the PUSCH with a "third type" GF-RNTI and (ii) masking the data transmitted on the PDCCH and scrambling the data transmitted on the PDSCH with the same "third type" GF-RNTI for each UE. In this case, the downlink uses a common feedback solution. That is, the "third type" GF-RNTI may be a common group GF-RNTI that may be used for a group response related to grant-free transmissions.

A second specific implementation of example technique 3-2 involves (i) scrambling data transmitted on the PUSCH with a "fourth type" GF-RNTI and (ii) masking data transmitted on the PDCCH and scrambling data transmitted on the PDSCH with the "third type" GF-RNTI for each UE. Again, the downlink uses a common feedback solution. That is, the "third type" GF-RNTI may be a common group GF-RNTI that may be used for a group response relating to grant-free transmissions.

A third specific implementation of example technique 3-2 involves (i) scrambling data transmitted on the PUSCH with a "fourth type" GF-RNTI and (ii) masking data transmitted on the PDCCH and scrambling data transmitted on the PDSCH with the same "fourth type" GF-RNTI for each UE. In this case, the downlink uses a UE-specific feedback solution. That is, the "fourth type" GF-RNTI may be a UE-specific GF-RNTI that may be used for a UE-specific response relating to grant-free transmissions.

A fourth specific implementation of example technique 3-2 involves (i) scrambling data transmitted on the PUSCH with a "third type" GF-RNTI and (ii) masking data transmitted on the PDCCH and scrambling data transmitted on the PDSCH with the "fourth type" GF-RNTI for each UE. Again, the downlink uses a UE-specific feedback solution. That is, the "fourth type" GF-RNTI may be a UE-specific GF-RNTI that may be used for a UE-specific response relating to grant-free transmissions.

The first through fourth specific implementations of example technique 3-2 are further represented in the following Table 2:

TABLE 2

GF-RNTI for UL/DL based on PRACH resource unit information

| GF-RNTI for PUSCH | GF-RNTI for PDCCH/PDSCH |
|---|---|
| Third type GF-RNTI | Third type GF-RNTI |
| Third type GF-RNTI | Fourth type GF-RNTI |
| Fourth type GF-RNTI | Third type GF-RNTI |
| Fourth type GF-RNTI | Fourth type GF-RNTI |

A fifth specific implementation of example technique 3-2 involves masking the data transmitted on the PDCCH and scrambling the data transmitted on the PDSCH with the "fourth type" GF-RNTI. In this case, a dedicated UE ID is carried in the response with DCI information bits. For example FIG. 9A illustrates an example of the DCI format. In this case, there is a one-to-one mapping of the GF-RNTI to the UE 101, such that two UE selecting the same sub-resource unit will have same GF-RNTI). The UE-specific search space associated to the "fourth type" GF-RNTI may be monitored by the UE 101. The UE 101 may de-mask the PDCCH and after successfully decoding the PDCCH may find the related response.

A sixth specific implementation of example technique 3-2 involves scrambling only the data transmitted on the PDSCH with the specific "fourth type" GF-RNTI for a UE-specific response to grant-free transmission. In this case, the dedicated UE ID occupies PDSCH information bits. As such, in this example, the feedback from the base station 501 to the UE 101 is only with the PDSCH. A predefined specific resource allocation for PDSCH associated with the fourth GF-RNTI and blind detection may be used. For instance, FIG. 9B illustrates an example of a DL slot including the UE ID and scrambling with the GF-RNTI (which in this case may be the "fourth type" GF-RNTI).

Depending on the implementation (e.g., first through six), the UE 101 may descramble and/or de-mask the data on the PDCCH and/or PDSCH with the "third type" GF-RNTI or the "fourth type" GF-RNTI to obtain the message GF-MSG2 containing acknowledgement and/or response that the UE 101 may communicate in a grant-free manner.

Thus, it will be appreciated that in accordance with a specific and non-limiting example of implementation (see FIG. 12A), the base station 501 carries out a method of altering data transmitted on a physical downlink channel. The method includes deriving the GF-RNTI from the PRACH resource unit information between at least one user equipment (UE) and the base station 501 (step 1210), the GF-RNTI being common to a group of UEs or specific to each UE; and using the GF-RNTI to alter the data transmitted on the physical downlink channel (step 1220). Altering of data transmitted on the physical downlink channel may include masking the data transmitted on the PDCCH with at least the GF-RNTI and/or scrambling the data transmitted on the PDSCH with at least the GF-RNTI.

In another example, certain embodiments may provide a method of that comprises using an identifier determined from PUSCH resource unit information (or PRACH resource unit information associated with the PUSCH), and previously used for grant-free uplink communication, to process a physical downlink channel.

According to a first example there is provided a method of data communication that comprises obtaining resource unit information of a physical uplink channel between at least one user equipment (UE) and a base station; and using the identifier for grant-free communication between at least one UE and the base station.

According to a second example there is provided a method of data transmission between at least one user equipment (UE) and a base station, which comprises determining a grant-free radio network temporary identifier (GF-RNTI); and altering data or transmission on a physical channel with the GF-RNTI; transmitting the altered data on the physical channel.

According to a third example there is provided user equipment comprising a processor and an RF communication unit, the processor configured to obtain resource unit information of a physical uplink channel; determine a grant-free radio network temporary identifier (GF-RNTI) at least in part based on the resource unit information; and use the GF-RNTI for grant-free communication with a base station over the physical channel.

According to a fourth example there is provided user equipment comprising a method of processing a physical downlink channel, which comprises: using an identifier determined from PUSCH resource unit information and previously used for grant-free uplink communication to process the physical downlink channel.

According to a fifth example, there is provided a method of processing a physical downlink channel, which comprises: using an identifier determined from PRACH resource unit information and previously used for grant-free uplink communication to process the physical downlink channel.

According to a further example, there is provided a method of data communication, comprising: obtaining resource unit information associated with a physical uplink channel; determining an identifier at least in part based on the resource unit information; and using the identifier for transmission of a physical uplink shared channel (PUSCH).

According to a further example, there is provided a method of data communication, comprising: obtaining resource unit information associated with a physical uplink channel; determining an identifier at least in part based on the resource unit information; and using the identifier for transmission of a physical downlink channel.

According to a further example, there is provided an apparatus comprising a processor and an RF communication unit, the processor configured to obtain resource unit information associated with a physical uplink channel; determine an identifier at least in part based on the resource unit information; and use the identifier for transmission of a physical uplink shared channel (PUSCH) or a physical downlink channel.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

Although various embodiments and examples have been presented, this was for the purpose of describing, but not limiting, the invention. Various modifications and enhancements will become apparent to those of ordinary skill in the art and are within the scope of the invention, which is defined by the appended claims.

What is claimed is:

1. A method comprising:
    obtaining, by a user equipment (UE) apparatus, resource unit information for a physical uplink channel, wherein the physical uplink channel is a physical uplink shared channel (PUSCH) or a physical random access channel (PRACH);

using, by the UE apparatus, at least the resource unit information to calculate a value of an identifier, the using the at least the resource unit information comprising:

calculating, by the UE apparatus, the value of the identifier based on a sum of (1) a random access radio network temporary identifier (RA-RNTI) multiplied by a first factor and (2) a preamble index of the physical uplink channel multiplied by a second factor, wherein the RA-RNTI is calculated based on a frequency domain index of the physical uplink channel multiplied by a third factor and a time domain index of the physical uplink channel multiplied by a fourth factor; and using, by the UE apparatus, the identifier for scrambling data in transmission of the PUSCH.

2. The method of claim 1, wherein the physical uplink channel is the PRACH.

3. The method of claim 1, wherein the resource unit information comprises at least one of time resource unit information, frequency resource unit information, and sub resource unit information associated with the physical uplink channel.

4. The method of claim 1, further comprising:
altering, by the UE apparatus, the data for the transmission by the PUSCH, the altering including at least one of a scrambling operation or a masking operation.

5. The method of claim 1, further comprising:
using the identifier for reception of at least one of a physical downlink control channel (PDCCH) and a physical downlink shared channel (PDSCH) which is altered by a first identifier.

6. The method of claim 1, the identifier being a first identifier, the method further comprising:
determining a second identifier based on second resource unit information different from the resource unit information; and
using the second identifier for reception of at least one of a physical downlink control channel (PDCCH) and a physical downlink shared channel (PDSCH) which is altered by the first identifier.

7. The method of claim 3, wherein the time resource unit information pertaining to at least one data resource unit comprises an index representing a system frame, subframe, time slot, mini-slot or OFDM symbol.

8. The method of claim 3, wherein the frequency resource unit information pertaining to at least one data resource unit comprises an index representing a sub-band, PRB (physical resource block), PRB set, PRG (PRB group), SC (subcarrier) or BWP (bandwidth part).

9. The method of claim 3, wherein the sub resource unit information pertaining to at least one data resource unit is representative of a codebook/codeword, sequence, interleaver pattern, mapping pattern, demodulation reference signal, preamble or spatial, power, layer or port domain.

10. The method of claim 1, wherein the resource unit information associated with the physical uplink channel is explicitly configured or indicated by at least one of a broadcasting channel and a dedicated semi-static channel (RRC).

11. The method of claim 1, wherein the identifier is a grant-free radio network temporary identifier (GF-RNTI) determined based on the resource unit information for the physical uplink channel.

12. The method of claim 1, the resource unit information including a preamble sequence index of the physical uplink channel.

13. A user equipment (UE) apparatus comprising:
at least one processor;
an RF communication unit; and
a non-transitory computer readable storage medium storing programming, the programming including instructions for execution by the at least one processor to cause the UE apparatus to perform operations including:
obtaining resource unit information for a physical uplink channel, wherein the physical uplink channel is a physical uplink shared channel (PUSCH) or a physical random access channel (PRACH);
using at least the resource unit information to calculate a value of an identifier, the using the at least the resource unit information comprising:
calculating the value of the identifier based on a sum of (1) a random access radio network temporary identifier (RA-RNTI) multiplied by a first factor and (2) a preamble index of the physical uplink channel multiplied by a second factor,
wherein the RA-RNTI is calculated based on a frequency domain index of the physical uplink channel multiplied by a third factor and a time domain index of the physical uplink channel multiplied by a fourth factor; and
using the identifier for scrambling data in transmission of the PUSCH.

14. The UE apparatus of claim 13, wherein the physical uplink channel is the PRACH.

15. The UE apparatus of claim 13, wherein the resource unit information comprises at least one of time resource unit information, frequency resource unit information, and sub resource unit information associated with the physical uplink channel.

16. The UE apparatus of claim 13, the operations further comprising:
altering the data for the transmission by the PUSCH, altering the data including at least one of a scrambling operation or a masking operation.

17. The UE apparatus of claim 13, the operations further comprising:
using the identifier for reception of at least one of a physical downlink control channel (PDCCH) and a physical downlink shared channel (PDSCH) which is altered by a first identifier.

18. The UE apparatus of claim 13, the identifier being a first identifier, the operations further comprising:
determining a second identifier based on second resource unit information different from the resource unit information; and
using the second identifier for reception of at least one of a physical downlink control channel (PDCCH) and a physical downlink shared channel (PDSCH) which is altered by the first identifier.

19. The UE apparatus of claim 15, wherein the time resource unit information pertaining to at least one data resource unit comprises an index representing a system frame, subframe, time slot, mini-slot or OFDM symbol.

20. The UE apparatus of claim 15, wherein the frequency resource unit information pertaining to at least one data resource unit comprises an index representing a sub-band, PRB (physical resource block), PRB set, PRG (PRB group), SC (sub-carrier) or BWP (bandwidth part).

21. The UE apparatus of claim 15, wherein the sub resource unit information pertaining to at least one data resource unit is representative of a codebook/codeword, sequence, interleaver pattern, mapping pattern, demodulation reference signal, preamble or spatial, power, layer or port domain.

22. The UE apparatus of claim 13, wherein the resource unit information associated with the physical uplink channel is explicitly configured or indicated by at least one of a broadcasting channel and a dedicated semi-static channel (RRC).

23. The UE apparatus of claim 13, wherein the identifier is a grant-free radio network temporary identifier (GF-RNTI) determined based on the resource unit information for the physical uplink channel.

24. A non-transitory computer-readable medium having instructions stored thereon that, when executed by a user equipment (UE) apparatus, cause the UE apparatus to perform operations, the operations comprising:

obtaining resource unit information for a physical uplink channel, wherein the physical uplink channel is a physical uplink shared channel (PUSCH) or a physical random access channel (PRACH);

using at least the resource unit information to calculate a value of an identifier, the using the at least the resource unit information comprising:

calculating the value of the identifier based on a sum of (1) a random access radio network temporary identifier (RA-RNTI) multiplied by a first factor and (2) a preamble index of the physical uplink channel multiplied by a second factor, wherein the RA-RNTI is calculated based on a frequency domain index of the physical uplink channel multiplied by a third factor and a time domain index of the physical uplink channel multiplied by a fourth factor; and using the identifier for scrambling data in transmission of the PUSCH.

25. The non-transitory computer-readable medium of claim 24, wherein the physical uplink channel is the PRACH.

26. The non-transitory computer-readable medium of claim 24, wherein the resource unit information comprises at least one of time resource unit information, frequency resource unit information, and sub resource unit information associated with the physical uplink channel.

* * * * *